United States Patent
Reeves

(10) Patent No.: US 11,120,094 B1
(45) Date of Patent: *Sep. 14, 2021

(54) RESOURCE VIEW DATA COLLECTION

(71) Applicant: Google LLC, Mountain View, CA (US)

(72) Inventor: Damian Reeves, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/378,007

(22) Filed: Apr. 8, 2019

Related U.S. Application Data

(63) Continuation of application No. 14/273,136, filed on May 8, 2014, now Pat. No. 10,282,479.

(51) Int. Cl.
*G06F 16/955* (2019.01)

(52) U.S. Cl.
CPC ................... *G06F 16/955* (2019.01)

(58) Field of Classification Search
CPC ......... G06F 17/30867; G06F 17/30864; G06F 17/30876; G06F 17/3053; G06F 17/3087
USPC ......................................... 707/708
See application file for complete search history.

(56) References Cited

U.S. PATENT DOCUMENTS

| | | |
|---|---|---|
| 6,466,970 B1 | 10/2002 | Lee et al. |
| 8,041,695 B2 | 10/2011 | Wang |
| 8,255,526 B2 | 8/2012 | Christensen et al. |
| 2005/0273706 A1 | 12/2005 | Manber et al. |
| 2007/0198727 A1 | 8/2007 | Guan |
| 2008/0040224 A1* | 2/2008 | Roker .................. H04L 63/14 |
| | | 705/14.66 |
| 2008/0075062 A1* | 3/2008 | Neil ....................... G06F 9/451 |
| | | 370/351 |
| 2008/0098300 A1* | 4/2008 | Corrales ............. G06F 16/986 |
| | | 715/243 |
| 2008/0141161 A1 | 6/2008 | Raven |
| 2009/0172551 A1* | 7/2009 | Kane ..................... G06Q 30/02 |
| | | 715/733 |
| 2009/0271514 A1* | 10/2009 | Thomas ............. G06F 11/3495 |
| | | 709/224 |

(Continued)

FOREIGN PATENT DOCUMENTS

WO    WO200221291    3/2002

OTHER PUBLICATIONS

Sullivan, "Pixel Delivery Best Practices," [online] [Retrieved on Jan. 9, 2013]; Retrieved from the Internet URL: http://www.admonsters.com/blog/pixel-delivery-best-practices, 6 pages.

*Primary Examiner* — Hosain T Alam
*Assistant Examiner* — Nicholas E Allen
(74) *Attorney, Agent, or Firm* — Fish & Richardson P.C.

(57) ABSTRACT

Methods, systems, and apparatus, including computer programs encoded on a computer storage medium, for collecting data regarding resource views. In one aspect, a method includes generating a tag that includes instructions that, upon execution of the instructions, cause a device to perform operations including identifying content located in at least one particular portion of a structured resource. The particular portion can be specified by the instructions. The operations may include generating resource view data that includes parameters identifying the device and at least a portion of the identified content. The operations may include sending the resource view data to a server. A request for the tag may be received. The tag may be provided in response to the request.

20 Claims, 4 Drawing Sheets

(56) References Cited

U.S. PATENT DOCUMENTS

| | | | |
|---|---|---|---|
| 2010/0030763 A1* | 2/2010 | Chi | G06F 16/951 707/770 |
| 2010/0042495 A1* | 2/2010 | Malden | G06Q 30/0249 705/14.48 |
| 2011/0125593 A1 | 5/2011 | Wright et al. | |
| 2011/0173071 A1* | 7/2011 | Meyer | G06Q 30/02 705/14.54 |
| 2011/0219295 A1* | 9/2011 | Adams | G06F 16/00 715/234 |
| 2011/0289317 A1* | 11/2011 | Darapu | H04N 21/25816 713/168 |
| 2011/0314092 A1* | 12/2011 | Lunt | H04L 67/10 709/203 |
| 2012/0010995 A1* | 1/2012 | Skirpa | G06F 16/9577 705/14.49 |
| 2012/0016897 A1* | 1/2012 | Tulumbas | G06F 16/9566 707/759 |
| 2012/0030560 A1* | 2/2012 | Yano | G06F 16/9577 715/234 |
| 2012/0046996 A1 | 2/2012 | Shah et al. | |
| 2012/0150831 A1* | 6/2012 | Sun | G06F 16/951 707/706 |
| 2012/0166520 A1* | 6/2012 | Lindsay | G06F 3/0488 709/203 |
| 2012/0221404 A1* | 8/2012 | Ahmed | G06Q 30/0261 705/14.39 |
| 2012/0284290 A1* | 11/2012 | Keebler | G06F 16/958 707/756 |
| 2013/0024758 A1* | 1/2013 | Darby | G06F 16/748 715/205 |
| 2013/0041653 A1* | 2/2013 | Tseng | G06F 16/90324 704/9 |
| 2013/0044106 A1* | 2/2013 | Shuster | G06T 19/003 345/419 |
| 2013/0110637 A1* | 5/2013 | Bott | G06Q 30/0244 705/14.64 |
| 2013/0166634 A1* | 6/2013 | Holland | G06F 11/3419 709/203 |
| 2013/0179791 A1 | 7/2013 | Polski et al. | |
| 2013/0191723 A1* | 7/2013 | Pappas | G06F 16/86 715/234 |
| 2013/0204450 A1* | 8/2013 | Kagan | H04L 67/06 700/291 |
| 2013/0204694 A1* | 8/2013 | Banister | G06Q 30/0255 705/14.41 |
| 2013/0268490 A1* | 10/2013 | Keebler | G06F 16/9535 707/627 |
| 2013/0275433 A1* | 10/2013 | Shibata | G06F 16/93 707/740 |
| 2013/0290821 A1* | 10/2013 | Pollack | G06F 16/9566 715/208 |
| 2013/0318157 A1* | 11/2013 | Harrison | H04L 67/16 709/203 |
| 2013/0332869 A1 | 12/2013 | Ferry | |
| 2013/0339139 A1* | 12/2013 | Meyers | G06Q 30/0241 705/14.49 |
| 2014/0040026 A1* | 2/2014 | Swaminathan | G06Q 30/02 705/14.53 |
| 2014/0040786 A1* | 2/2014 | Swanson | G06F 3/0484 715/760 |
| 2014/0046985 A1* | 2/2014 | Gauthier | G06F 40/177 707/812 |
| 2014/0068411 A1* | 3/2014 | Ross | G06F 16/954 715/234 |
| 2014/0081680 A1* | 3/2014 | Telle | G06Q 10/063 705/7.11 |
| 2014/0110468 A1* | 4/2014 | Kandregula | G06K 7/1447 235/375 |
| 2014/0120864 A1* | 5/2014 | Manolarakis | G06Q 30/0251 455/405 |
| 2014/0122220 A1 | 5/2014 | Bradley | |
| 2014/0122255 A1* | 5/2014 | Snyder | G06Q 30/0276 705/14.72 |
| 2014/0123033 A1* | 5/2014 | Uhma | G06F 9/45529 715/753 |

* cited by examiner

RESOURCE VIEW DATA COLLECTION

CROSS-REFERENCE TO RELATED APPLICATION

This application is a continuation application of U.S. application Ser. No. 14/273,136, filed May 8, 2014, which is incorporated by reference.

BACKGROUND

The Internet enables access to a wide variety of resources. For example, video, audio, web pages directed to particular subject matter, news articles, images, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages). An advertisement is an example of a content item that advertisers can provide for presentation with particular resources, such as web pages and search results pages. An advertisement can be made eligible for presentation with specific resources and/or resources that are determined to match specified distribution criteria, such as distribution keywords.

Some advertisers use remarketing techniques to present advertisements to users that have previously viewed their website. The advertiser may work with an advertisement provider to display advertisements to the user as the user browses other websites. For example, the advertiser may want to display to a user advertisements related to televisions after the user has viewed a product web page of the advertiser related to televisions.

SUMMARY

This specification describes technologies relating to collecting data of a resource when the resource is viewed by a user.

In general, one innovative aspect of the subject matter described in this specification can be embodied in methods that include the actions of generating a tag that includes instructions that, upon execution of the instructions, cause a device to perform operations including: identifying content located in at least one particular portion of a structured resource, the at least one particular portion being specified by the instructions; generating resource view data that includes parameters identifying the device and at least a portion of the identified content; and sending the resource view data to a server; receiving a request for the tag; and providing the tag in response to the request. Other embodiments of this aspect include corresponding systems, apparatus, and computer programs, configured to perform the actions of the methods, encoded on computer storage devices.

These and other embodiments can each optionally include one or more of the following features. Aspects can include performing the identifying, generating, and sending based on the execution, by a user device, of the instructions included in the tag, wherein the tag is included in a particular resource received by the user device.

Generating the resource view data can include generating a uniform resource locator (URL) that includes the parameters. Sending the resource view data to the server can include sending the resource view data to the server using the generated URL. Aspects can include determining that a data size for the URL exceed a maximum data size; and in response to determining that the data size for the URL exceed the maximum data size, performing at least one of: (a) compressing at least a portion of the identified content; truncating characters of at least a portion of the identified content included in the parameters; or (c) summarizing at least a portion of the identified content using a text summarization technique.

In some aspects, the identified content can include individual portions of content identified at different particular portions of the structured resource. Each portion of content can be associated with a priority value based on a structural area of the resource from which the portion of content was identified. Generating the URL can include concatenating the portions of content to the URL based on the priority values until a maximum data size for the URL is reached. Generating the URL can include condensing the portions of the content based on the priority value of each portion of content.

Aspects can include identifying an opt-out control of the resource, the opt-out control specifying at least one portion of the structured resource at which content should not be sent to the server; and determining to not include content located at the at least one portion of the structured document in the parameters based on the identified opt-out control.

In some aspects, identifying content located in at least one particular portion of the structured resource can include at least one of (a) evaluating a model of the structured resource to identify one or more particular markup tags included in the structured resource or (b) evaluating a computer programming language environment of the structured resource to identify one or more particular functions and executing the identified one or more particular functions. Identifying content located in the identified structural areas of the structured resource can include identifying content located between a corresponding pair of the particular markup tags. In some aspects, the model of the structured resource can include a document object model (DOM) of the structured resource.

Particular embodiments of the subject matter described in this specification can be implemented so as to realize one or more of the following advantages. Rich content regarding resource views can be obtained automatically for individual resource views by extracting content from particular areas of the resource when the resource is viewed. Content obtained in this manner can be used to identify topics of the resource more accurately than manually tagging the resources with tags, which may be incorrect or outdated. In addition, the burden of manually tagging resources may be reduced to downloading a data collection tag that automatically obtains rich data for resource views. Content presented in dynamically-generated resources can be collected for individual resource views using a data collection tag included in the resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
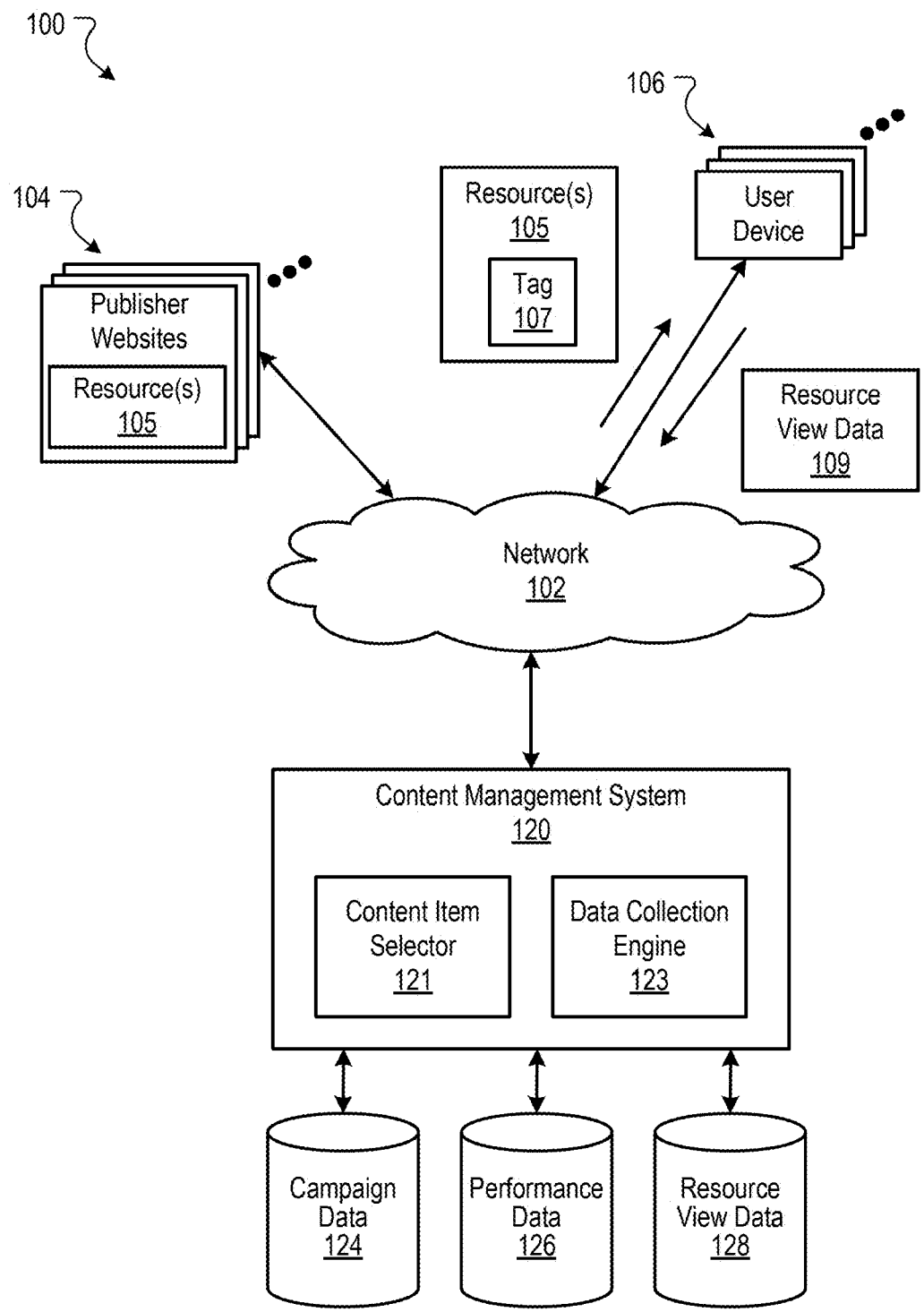
FIG. 1 is an example environment in which a content management system provides content items and collects data regarding resource views.

A data collection tag can be included with a resource, e.g., web page or application, to collect data regarding a view of the resource and/or interactions with the resource when presented. For example, the data collection tag may include instructions for identifying particular types of content included in the resource and for sending the content to another device. In a particular example, the instructions of the data collection tag can cause data identifying the particular types of content to be sent to a server of the resource's publisher or to a server of a content item distributor, such as an advertisement distributor. The data can include, for example, the title of the resource, an identifier for a user device at which the resource was displayed, an identifier for the publisher of the resource, data regarding products or other content presented in the resource, data regarding interactions with the resource, and/or data regarding particular portions of the resource viewed. As used throughout this document, the term "view" is used to refer to a presentation of an item, e.g., of a resource.

The instructions of the data collection tag can specify types of content to collect from resources in which the data collection tag is included. For example, the data collection tag may include instructions for collecting content from particular structural areas of a structured resource, e.g., a resource having structure elements. Many structured resources are structured using markup, e.g., Hypertext Markup Language (HTML) tags markup tags for social network related resources, markup tags for search related web pages and/or other types of markup or tags. For example, a markup tag for a search related web page may include tags for products or places related to the resource. The data collection tag can include instructions for collecting content that is designated by particular markup tags. For example, the data collection tag may include instructions for collecting content from semantic HTML tags, such as title tags, initial paragraph tags, and/or image caption tags. Such content can be used to identify topics of the resource, products or services included in the resource, data related to the products or services (e.g., price, model, etc.), and/or other contextual data.

Content of a resource identified using the data collection tag can be sent to another device using, for example, a Hypertext Transfer Protocol (HTTP) request or another type of network request. For example, the instructions of the data collection tag may cause the user device at which the resource is displayed to generate a web address, e.g., a uniform resource locator (URL), that includes a domain name (e.g., for a content item provider) and one or more parameters. The parameters may be part of a query string and may include the content identified in the resource. For example, the URL may include a parameter that identifies the title of the resource and another parameter that includes a device identifier for the user device. The URL may then be used to send the parameters from the user device to a server referenced by the domain name.

The data collected using the data collection tag can be used in remarketing services. For example, an entity that publishes resources, such as an advertiser that publishes landing pages, may add the tag to particular resources, e.g., landing pages for products or services offered by the advertiser. The data collected using the tags on the landing pages can be used to remarket content to users that visited the landing pages. For example, if a user views a landing page related to a particular car, content items related to the car may be provided to the user as the user views other resources (e.g., resources that do not include information related to the particular car).

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

FIG. 1 is an example environment 100 in which a content management system 120 provides content items and collects data regarding resource views. A computer network 102, such as a local area network (LAN), wide area network (WAN), the Internet, or a combination thereof, connects publisher websites 104, user devices 106, and a content management system 120. The environment 100 may include many publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource 105 is any data that can be provided by the publisher 104 over the network 102 and that is associated with a resource address. Resources include HTML pages, word processing documents, and portable document format (PDF) documents, images, videos, online games, maps, and feed sources, to name just a few. The resources can include content, such as words, phrases, pictures, and so on, and may include embedded information (such as meta information and hyperlinks) and/or embedded instructions (such as scripts).

A resource 105 may also include, or by provided by, an application, e.g., an app. For example, an application executing on a user device 106 may receive content from a publisher and present the content on the user device 106. Applications can include games, multimedia applications, productivity applications, applications provided by businesses and other organizations, to name just a few examples.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network. The user device 106 may also include one or more applications. For example, the user device 106 may be a mobile device that includes one or more mobile apps.

A user device 106 can request resources 105 from a website 104. In turn, data representing the resource 105 can be provided to the user device 106 for presentation by the user device 106. The data representing the resource 105 can include resource content (e.g., text, images, videos, etc. of the resource 105) and content item slots (e.g., advertisement slots). When a resource 105 having a content item slot is requested by a user device 106, the content management system 120 receives a content item request requesting content items to be provided with the resource content. A content item request can include data regarding the resource 105 on which the content item will be presented (e.g., category or keywords found on the resource, data regarding publisher of resource, etc.), and/or other data. If the content items are to be presented in content item slots of a search results page, the content item request may include keywords of a search query submitted to a search system.

The content management system 120 includes a content item selector 121 that facilitates the distribution of content items with the resources 105. Content items can include advertisements, text, images, videos, newsletters, coupons, documents, or another type of content item. The content management system 120 allows content item providers, e.g., advertisers, to define distribution criteria that take into account attributes of the particular resource with which a content item will be presented for purposes of selecting a content item for presentation with the resource.

Example distribution criteria include keyword-based criteria for which content item providers provide bids for keywords. These bids are used to select a content item provider that will provide a content item for presentation at a user device 106. For example, when a particular keyword is matched by a search query submitted from a user device 106 or matched by web page content (or web page metadata) requested from the user device 106, the content items that are associated with the particular keyword are selected by the content item selector 121 as eligible content items to be provided to the user device. In turn, the bids for the keywords corresponding to each of the eligible content items can be used to determine which content item will be presented.

Distribution criteria can also include user-based criteria. For example, in a remarketing campaign, a content item provider may define criteria for presenting content items to users that have viewed particular resources, e.g., landing pages for particular products. When the user views other resources, content items of the content item provider may be shown to the user.

The content management system 120 includes, or is communicably coupled to, a data storage system that stores campaign data 124, performance data 126, and resource view data 128. The campaign data 124 stores, for example, content items, the distribution criteria for the content items, and budgeting information for content item providers. The performance data 126 stores data indicating the performance of the content items that are served. Such performance data can include, for example, click-through rates for content items, the number of impressions for content items, and the number of conversions for content items. Other performance data can also be stored.

The campaign data 124 and the performance data 126 can be used as input parameters to a content item selection process, e.g., an advertisement auction. For example, the content item selector 121, in response to each request for content items, can conduct an auction to select content items that are provided in response to the request. The content items can be ranked according to a rank score that, in some implementations, is proportional to a value that is determined based on a content item bid and one or more parameters specified in the performance data 126. A set (e.g., one or more) of the highest ranked content items in the auction (e.g., based on the rank scores) are selected and provided to the requesting user device.

Remarketing lists may also be used as input parameters to a content item selection process. A remarketing list may include identifiers for users, or for user devices associated with the users, that have viewed particular resources. For example, a remarketing list for a publisher or a content item provider may include identifiers for users that have viewed resources of the publisher or content item provider and data regarding views or interactions with the resources. A particular publisher or content item provider may include multiple remarketing lists, e.g., one for each resource or groups of resources.

The remarketing lists can be used as distribution criteria or to boost (e.g., increase) rank scores for content items. A content item provider may specify distribution criteria so that its content items are provided to users that have previously viewed resources of the content item provider. For example, an advertiser may specify distribution criteria so that advertisements related to a particular product are provided to users that have previously viewed a landing page for the product. The advertiser may also specify distribution criteria so that bids for its content items are boosted (e.g., increased) for content item requests received from user devices associated with users included on one of its remarketing lists. The remarketing lists can be generated from the resource view data 128. The resource view data 128 can include data related to resources 105 provided to or displayed on one or more user devices 106. This data can include, for each resource view, data identifying the viewed resource (e.g., a URL for a web page or the name of an application), an identifier for a user associated with a user device on which the resource was viewed, a device identifier for the user device on which the resource was viewed, and/or an identifier for a publisher that provides or publishes the resource. The data can also include content from the resource itself and/or data regarding interactions with the resource. For example, the data for a resource view may include the title of the resource, data identifying products and/or services presented in the resource, prices for the products or services, whether a product was added to an online shopping cart, whether a product or service was purchased and, if so, a purchase price, and/or other data as described in more detail below.

The content management system 120 can include a data collection engine 123 that collects the resource view data 128. The data collection engine 123 can receive the data from user devices 106, for example, in response to views of resources 105. The data can be received using data collection tags 107 of the resources 105. The data collection tags 107 can include instructions that, when executed by the user device 106 on which the resource 105 is viewed, causes the user device 106 to collect data of the resource 105 and send the data to the content management system 120. For example, the data collection tags 107 may include scripts that, when executed, cause the user device 106 to collect and send the data to the content management system 120.

Publishers and content item providers can obtain, e.g., download, the data collection tags 107 from the content management system 120 and include the tags 107 in resources 105 for which the publishers or content item providers would like to collect resource view data 128 and/or for which the publishers or content item providers would like to generate remarketing lists. For example, an advertiser may download the data collection tag 107 and include the data collection tag 107 in a landing page for a product for which the advertiser would like to generate a remarketing list.

In some implementations, the data collection tag 107 is a pixel, web bug, or web beacon. When a resource that includes the data collection tag 107 is presented, the instructions of the data collection tag 107 are executed. For example, a pixel-based data collection tag may "fire" when (or after) the resource is displayed. The instructions of the data collection tag 107 can be configured to identify data regarding the resource view and send the identified data to the content management system 120. This data can include an identifier for the user associated with the user device on which the resource is displayed, a device identifier for the user device, an identifier for the publisher of the resource, a URL for the resource (or other network address), and/or one or more cookies stored on the user device. In some implementations, the identifier for the user and/or device is stored in a cookie that is identified by the data collection tag 107.

The data collection tag 107 can also be configured to identify content of the resource located in particular structural areas of a resource. In some implementations, the data collection tag 107 may be configured to evaluate a document object model (DOM) of the resource to identify particular markup tags or other structural areas of the resource. For example, the data collection tag 107 may be configured to identify particular HTML tags. The data collection tag 107 may also be configured to evaluate particular data layers, e.g., script data layers, to identify content.

In some implementations, the data collection tag 107 is configured to collect a set of content from resources in which the data collection tag 107 is included. For example, the data collection tag 107 may include instructions for collecting data from the DOM of the resources and from particular data layers of the resources. In some implementations, the data collection tag 107 is configured to introspect a programming language environment of a resource 105, e.g., a script language environment of the resource. For example, the instructions of the data collection tag 107 may cause the user device 106 to evaluate the programming language environment of the resource to determine whether the programming language environment includes one or more particular functions. If a function is identified, e.g., a function specified by the data collection tag 107, the instructions may cause the user device 106 to invoke or execute the function and collect the result(s) of invoking or executing the function. The result(s) could also be used as a further argument to other functions, e.g., in the programming language environment, for which data could be collected. For example, the user device 106 may call and execute additional functions in response to executing the identified function. The result(s) of each executed function can be collected for transmission to the content management system 120.

Publishers or content item providers may be provided with an opportunity to control whether and how the collection of data is performed. For example, the publishers or content providers that elect to include the data collection tag 107 on their resources may opt out of the collection of certain types of data by including an opt-out control with the resource. An opt-out control can specify types of content or structural areas of the resource from which content should not be collected. For example, an opt-out control may specify that a DOM analysis should not be performed and/or that content should not be collected from social network related tags or from particular social network related tags. In another example, an opt-out control may specify that the programming language environment should not be introspected or that particular functions of the programming language environment should not be invoked or executed. An example of an opt-out control is illustrated in FIG. 2 and described below.

The data collection tag 107 can cause the user device 106 to generate and send resource view data 109 to the content management system 120. The resource view data 109 can include all or at least a portion of the data identified by the data collection tag 107, e.g., identifiers, cookies (or content stored therein), and content identified in the structural areas of the resource. In some implementations, the data collection tag 107 generates a URL to send the resource view data 109 to the content management system 120. The URL may include a URL path to a server of the content management system 120 and parameters for the identified data. The parameters may include key-value pairs for the resource data. For example, a key-value pair for the title of the resource may be "t=Product_Page_A" where the title of the resource is "Product Page A." The content management system 120 can receive the data included in the URL and store the data in the resource view data 128.

The data collection tag 107 can send resource view data 109 using other communication techniques. For example, a data collection tag 107 of an application, e.g., a mobile app, may cause the user device executing the application to send an e-mail message or other appropriate type of message to the content management system 120. The message can include the resource view data 109.

Figure 2:
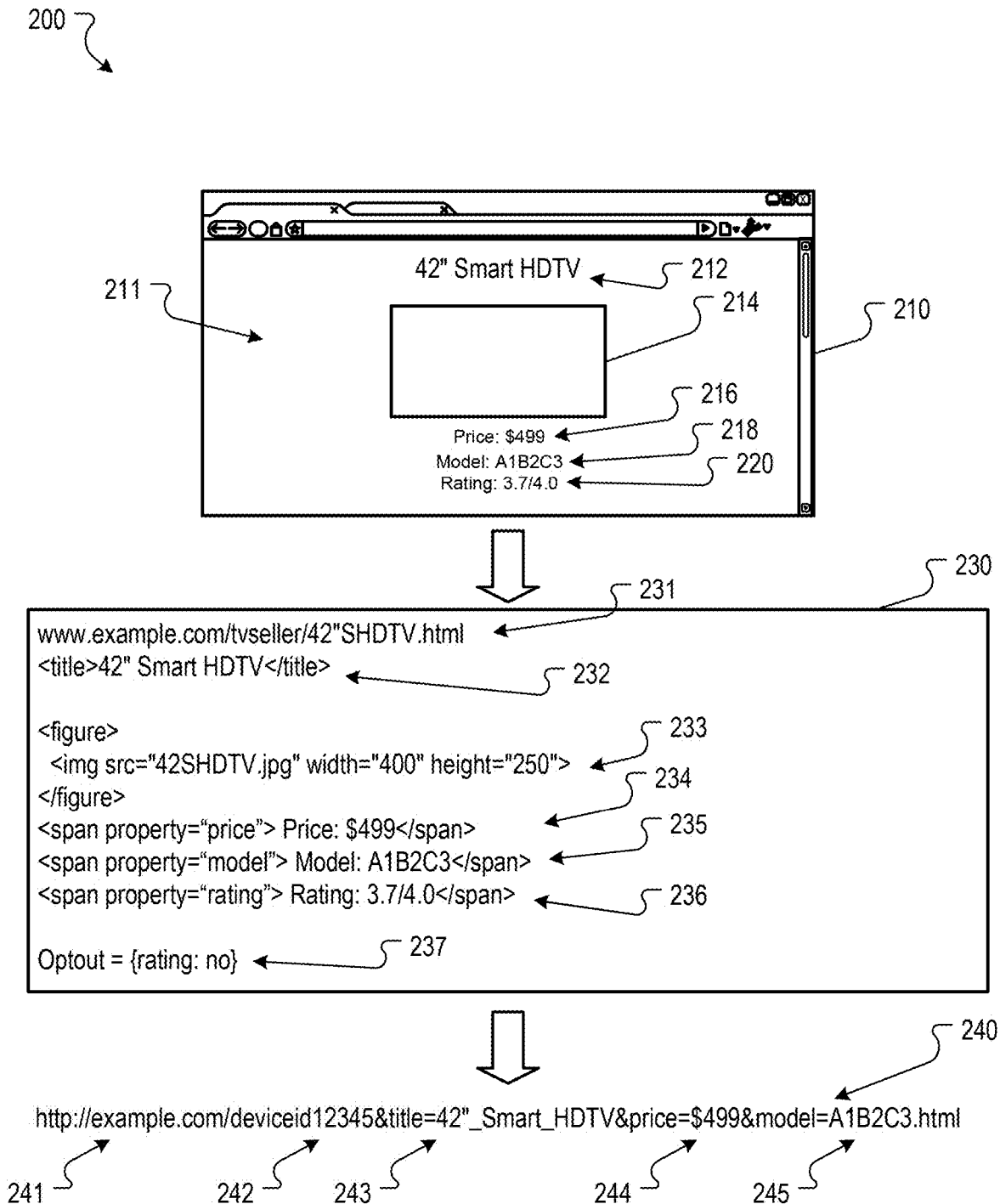
FIG. 2 is an example data flow for generating data regarding a resource view.

FIG. 2 is an example data flow 200 for generating data regarding a resource view. In the example data flow 200, a web page 211 is presented by an application 210, e.g., a web browser. The example web page 211 includes a title 212, an image 214, a price 216, a model number 218, and a rating 220. Of course, the web page 211 could include other content or not include some of the content illustrated in FIG. 2. The web page 211 may be displayed on a user device using the application 210.

The example web page 211 includes a DOM 230 that may be analyzed by a data collection tag to identify content for sending to another device, e.g., a content management system 120. The DOM 230 includes a URL 231 for the web page 211 and markup tags that define a structure for the content of the web page 211. For example, the DOM 230 includes title markup tags 232 that contain text of the title of the web page 211, figure markup tags 233 that specify the image and the size of the image, price markup tags 234 that contain text for the price, model markup tags 235 that contain text for the model number, and rating tags 236 that contain text for the rating.

A data collection tag 107 can include instructions for evaluating the DOM 230 to collect content contained in particular markup tags. For example, the data collection tag 107 may include instructions for collecting content contained in title tags, price tags, model tags, and rating tags. Based on the instructions, the user device may evaluate the DOM 230 to detect the particular tags and, if detected, collect content contained in the tags. The data collection tag 107 may also include instructions for collecting other data, such as a device identifier. For example, the device identifier may be stored in a cookie on the user device that displays the web page 211. The data collection tag 107 may include instructions for obtaining the device identifier from the cookie.

The example web page 211 includes an opt-out control 237. The example opt-out control 237 specifies that content contained in rating markup tags should not be collected by the data collection tag 107. For example, the publisher of the web page 211 may not want rating data collected or may not want to use rating data in remarketing efforts. The opt-out control 237 can prevent the content contained in the rating markup tags 235 from being collected. For example, the data collection tag 107 may include instructions for identifying opt-out tags and preventing the collection of data specified by the opt-out tags.

The instructions of the data collection tag 107 can also cause the user device to generate a URL 240 that includes the content collected from the DOM and other data, e.g., device identifier for the user device. The example URL 240 includes a URL path 241 to "example.com." The URL 240 also includes parameters for content related to the web page view. For example, the URL 240 includes a key-value pair 242 for the device identifier, a key-value pair 243 for the title, a key-value pair 244 for the price, and a key-value pair 245 for the model number. The URL path 241 can cause the user device to connect to a server associated with the URL path 241 and provide the parameters to the server.

Figure 3:
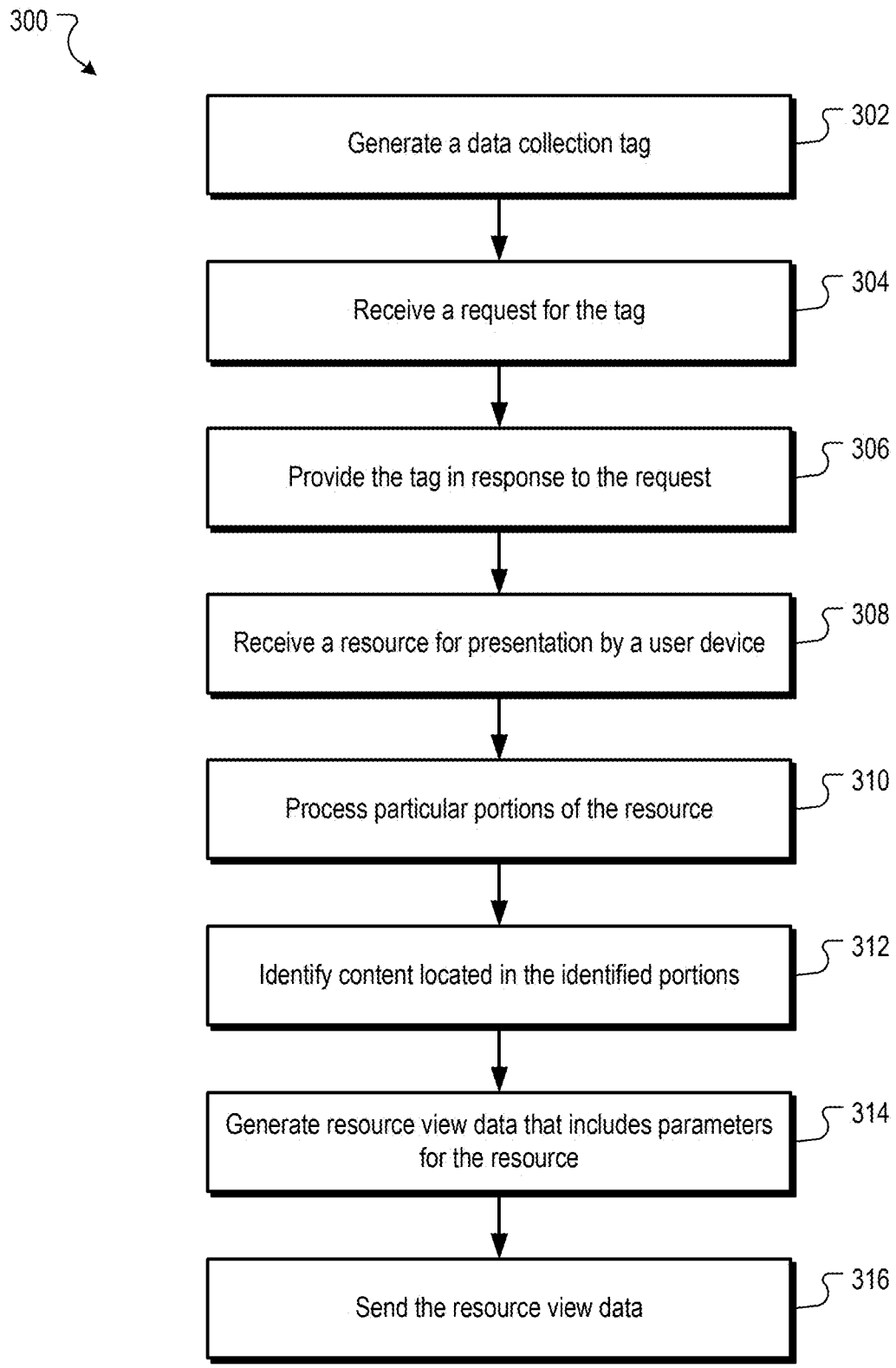
FIG. 3 is a flow diagram of an example process for collecting data regarding a resource view.

FIG. 3 is a flow diagram of an example process 300 for collecting data regarding a resource view. Operations of the process 300 can be implemented, for example, by a data processing apparatus, such as the content management system 120 and/or the user device 106 of FIG. 1. The process 300 can also be implemented by instructions stored on a non-transitory computer storage medium, where execution of the instructions by a data processing apparatus cause the data processing apparatus to perform the operations of the process 300.

At block 302, a data collection tag is generated. The data collection tag can include instructions for collecting particular data from resources (e.g., web pages) in which the data collection tag is included. For example, the instructions may be configured to cause the user device to collect data regarding a view of a resource, e.g., a structured resource, in response to the resource being viewed at a user device. As described in more detail below, the instructions may be configured to evaluate particular portions of the resource, e.g., its DOM or programming language environment, to identify content for collection.

In some implementations, the document collection tag may be configured for use by multiple different publishers and/or content item providers. For example, the document collection tag may include instructions for collecting a wide variety of data related to resource views. A publisher or content item provider may include the data collection tag on a resource, along with an opt-out control to prevent certain types of data from being collected.

Data collection tags may also be specific to each publisher or content item provider. For example, each publisher or content item provider may want to have different types of data collected. A data collection tag can be configured for each different publisher or content item provider to facilitate collection of the different types of data that the different publishers or content item providers would like to collect.

At block 304, a request for the data collection tag is received. For example, a publisher may request the data collection tag for inclusion with a particular resource. In some implementations, the publisher may navigate to the website of the content management system 120 to request the data collection tag.

At block 306, the data collection tag is provided to the publisher in response to the request. The publisher may then include the data collection tag with a resource. For example, the data collection tag may include a snippet of code that the publisher can copy and paste into the code of the resource. The publisher may then make the resource available for users to download, e.g., from a website.

At block 308, the resource that has the data collection tag is received for presentation at a user device. For example, a user may request the resource from the website that publishes the resource. In response, the resource may be provided to the user device for display. In another example, the resource may be a landing page for an advertisement. The user device may send a request for the landing page in response to the user selecting an advertisement that links to the landing page.

At block 310, the data collection tag included with the resource causes the user device to process particular portions of the resource. For example, the data collection tag may include instructions for collecting content from particular structural areas of web pages, such as content located between pairs of particular markup tags, e.g., pairs of title tags. In this example, the instructions of the data collection tag cause the user device to evaluate the DOM of the web page to determine whether the DOM includes a pair of title tags.

The data collection tag may also include instructions for collecting content located in particular data layers of a resource. For example, the data collection tag may include instructions for evaluating a script data layer to identify data sets and other content in the data layer. In another example, the data collection tag may include instructions for evaluating a programming language environment of the resource to identify functions, execute the functions, and collect data regarding the functions, e.g., the results of the functions.

At block 312, content located in the particular portions of the resource are identified for collection. For example, the user device may identify the text contained between a pair of title tags that were identified at block 310. The data collection tag may also include instructions for identifying any op-out controls included in the resource. If an opt-out control is identified in the resource, the user device may not collect data from structural areas specified by the opt-out control. For example, if the opt-out control specifies that image captions should not be collected, then the user device may not collect data contained in image caption tags in the resource even if the data collection tag is configured to collect image caption tags.

The data collection tag may also include instructions for identifying other data related to the resource view. For example, the data collection tag may include instructions for identifying an identifier for the user device, an identifier for a user associated with the user device cookie stored on the user device, a URL for the resource, an identifier for the publisher of the resource, and/or a cookie. In some implementations, the identifier for the user device and/or for a user associated with the user device may be obtained from the cookie. For example, the data collection tag may include instructions for obtaining the identifiers from the cookie.

In some implementations, the data collection tag can also include instructions for analyzing identified content to select content to provide to the content management system 120. For example, the instructions may cause the user device to identify keywords (e.g., one or more terms) that occur most often in the resource. The instructions may also cause the user device to remove certain stop words from content to be sent to the content management system 120 to reduce the amount of content being sent from the user device to the content management system 120.

At block 314, a resource view data is generated for the resource view. In some implementations, a URL is generated that includes the resource view data. The URL may include a URL path for a server of the content management system 120 and one or more parameters. The parameters can include at least a portion of the content identified in the structural areas of the resource and/or other data related to the resource view. In some implementations, the user device on which the resource is presented generates the URL based on instructions of the data collection tag. For example, the instructions may cause the user device to generate parameters, e.g., key-value pairs, for at least a portion of the identified content and data and generate a query string for the URL using the parameters.

In some implementations, the amount of data that can be included in a URL (or in another type of message) may be limited, e.g., to some threshold amount of data. If the amount of content and data identified for the resource view exceeds this threshold data limit, some of the data may be truncated or excluded. For example, the data collection tag may include instructions for generating the query string for the URL based on priority. In this example, particular types of data, e.g., data located in particular structural areas of the resource, may be associated with a respective priority score. The data collection tag may cause the user device to generate the URL by concatenating portions of the content to the query string in order based on priority until the data limit is reached. For example, the parameter that corresponds to the highest priority data type may be added first.

The data collection tag may also include instructions for truncating content based on a character limit for the type of content or based on an overall character limit for all types of content. For example, the instructions may cause the user device to identify up to the first 50 characters in each structural area for sending to the content management system. Characters in excess of 50 may be excluded from the URL.

The data collection tag may include instructions for summarizing content, for example, in response to the content exceeding the threshold amount of data or exceeding a character limit. For example, the instructions may cause the user device to execute a text summarization technique that condenses a group of content, e.g., a paragraph, into a summary. The summary may include keywords identified in a paragraph.

The data collection tag may include instructions for compressing and/or truncating the content based on priority scores for the content. For example, the instructions may cause the user device to compress or truncate the content in such a way to maximize a scoring heuristic to capture value of content versus data transmission or collection costs. Consider, for example, that the URL has a maximum data limit of 100 bytes and the data collection tag has identified two portions of content, content A and content B. Also, consider that content A and content B each includes 250 bytes of data, but content A has a higher priority value that content B. In this example, the data collection tag may cause the user device to condense content A into 75 bytes (e.g., by summarizing or truncating) and condense content B into 25 bytes (e.g., by summarizing or truncating).

In some implementations, the content and data being included in the URL may be compressed prior to generating the URL. For example, a compression technique tuned for character strings may be used to compress each portion of content. The compression technique may be included in the data collection tag.

The resource view data can be included in other appropriate types of network communication messages. For example, an e-mail message may be generated to include the resource view data. The e-mail message may include similar data as the URL, as described above.

At block 316, the resource view data is sent, e.g., to the content management system 120. Continuing the URL example from above, parameters of the URL may be sent using the URL. For example, the URL path may be used to initiate an HTTP request message to a server associated with the URL path. The message may include the parameters of the URL. The server can receive the message and store the parameters, for example, in resource view data 128.

In some implementations, the data collection tag may cause the user device to send the URL parameters to the content management system using a pixel fire technique. For example, the instructions of the data collection tag may cause a web browser executing on the user device to generate, in the resource, a new image tag that includes the URL. The image tag may then cause the web browser to send the parameters to the URL.

The content and data may be collected and sent to the content management system 120 after the resource is rendered at the user device. In this way, no additional page rendering latency may be added due to the data collection.

Although the process 300 has been described largely in terms of collecting data from a web page resource, data collection tags can also be used to collect data from applications, such as apps for portable devices. For example, a data collection tag may include instructions for evaluating screen views using a client-side software development kit (SDK). The content collected may include content presented in the screen view, e.g., text presented by the app. The instructions of the data collection tag may specify particular types of content to collect, such as product names and prices or the level being played on a game. The data collection tag can send the collected data to the content management system using a path identifier or an e-mail message.

Figure 4:
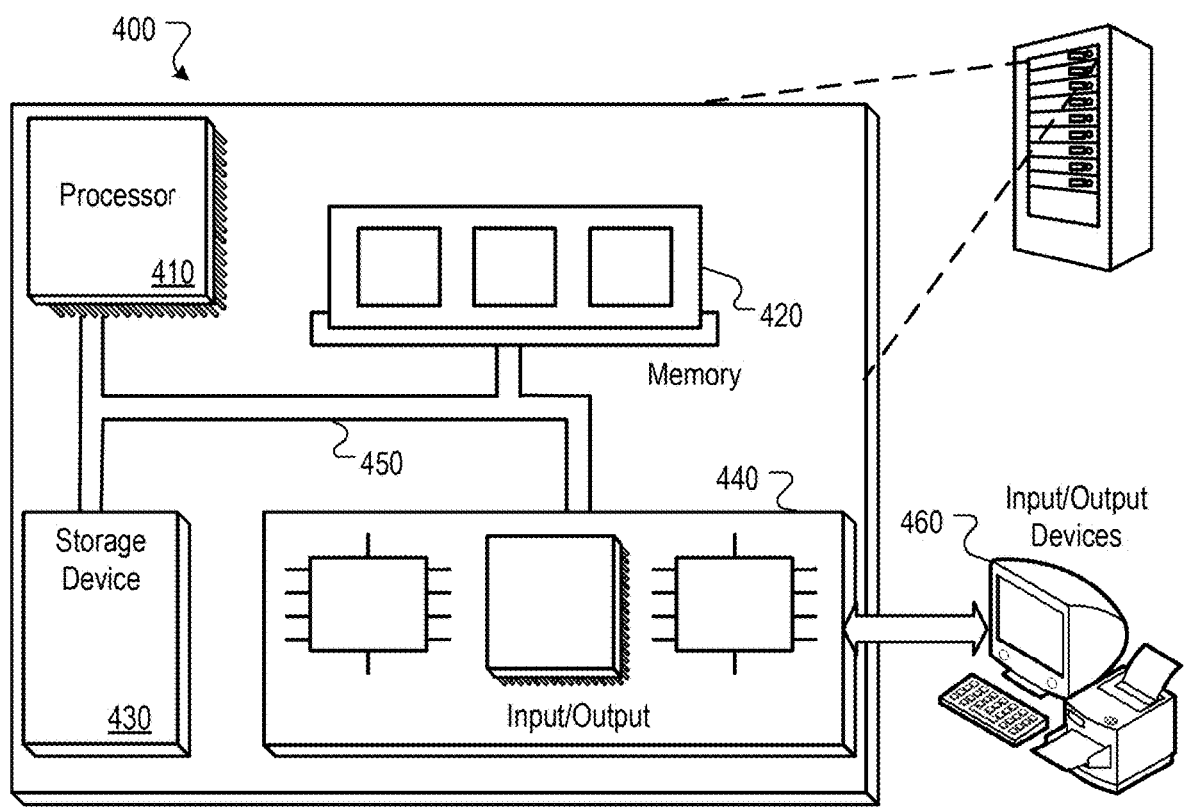
FIG. 4 is block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface device, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   generating a data collection tag that includes instructions that, upon execution of the instructions, cause an application browser executing at a client device to perform operations comprising:
      identifying, by the client device and within a document object model of a structured resource provided by a publisher, an item presented by the structured resource while the structured resource is presented by the application browser at the client device;
      generating, by the client device, resource view data that includes parameters identifying the client device and the item identified in the document object model while the structured resource was presented at the client device;
      appending, by the client device and to a uniform resource locator (URL) of a remote server, at least one key-value pair specifying the item that was identified in the document object model while the structured resource is presented by the application browser at the client device; and
      sending, by the client device and over a network, the key-value pair to the remote server using the URL;
   receiving, from the publisher, a request for the data collection tag; and
   providing the data collection tag to the publisher in response to the request.

2. The method of claim 1, further comprising:
   performing the identifying, generating, appending, and sending based on the execution, by a user device, of the instructions included in the data collection tag, wherein the data collection tag is included in a particular resource received by the user device.

3. The method of claim 2, wherein:
   generating the resource view data comprises generating a URL that includes the parameters; and
   sending the resource view data to the remote server includes sending the resource view data to the remote server using the generated URL.

4. The method of claim 1, further comprising:
   determining that a data size for the URL exceeds a maximum data size; and
   in response to determining that the data size for the URL exceeds the maximum data size, performing at least one of: (a) compressing at least a portion of the identified item; (b) truncating characters of at least a portion of the identified item included in the parameters; or (c) summarizing at least a portion of the identified item using a text summarization technique.

5. The method of claim 1, wherein appending at least one key-value pair the URL comprises concatenating portions of content of the identified item to the URL based on priority values of each portion of content until a maximum data size for the URL is reached.

6. The method of claim 5, wherein generating the resource view data comprises condensing the portions of the content of the identified item based on the priority value of each portion of content.

7. The method of claim 1, further comprising:
identifying an opt-out control of the resource, the opt-out control specifying at least one portion of the structured resource at which content should not be sent to the server; and
determining to not include content located at the at least one portion of the structured resource in the parameters based on the identified opt-out control.

8. The method of claim 1, wherein identifying content located in at least one particular portion of the structured resource comprises at least one of: (i) evaluating a model of the structured resource to identify one or more particular markup tags included in the structured resource, or (ii) evaluating a computer programming language environment of the structured resource to identify one or more particular functions and executing the identified one or more particular functions.

9. The method of claim 8, wherein identifying content located in identified structural areas of the structured resource comprises identifying content located between a corresponding pair of the particular markup tags.

10. The method of claim 8, wherein the model of the structured resource comprises a document object model (DOM) of the structured resource.

11. A system comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
generating a data collection tag that includes instructions that, upon execution of the instructions, cause an application browser executing at a client device to perform operations comprising:
identifying, by the client device and within a document object model of a structured resource provided by a publisher, an item presented by the structured resource while the structured resource is presented by the application browser at the client device;
generating, by the client device, resource view data that includes parameters identifying the client device and the item identified in the document object model while the structured resource was presented at the client device;
appending, by the client device and to a uniform resource locator (URL) of a remote server, at least one key-value pair specifying the item that was identified in the document object model while the structured resource is presented by the application browser at the client device; and
sending, by the client device and over a network, the key-value pair to the remote server using the URL;
receiving, from the publisher, a request for the data collection tag; and
providing the data collection tag to the publisher in response to the request.

12. The system of claim 11, further comprising:
performing the identifying, generating, appending, and sending based on the execution, by a user device, of the instructions included in the data collection tag, wherein the data collection tag is included in a particular resource received by the user device.

13. The system of claim 12, wherein:
generating the resource view data comprises generating a URL that includes the parameters; and
sending the resource view data to the remote server includes sending the resource view data to the remote server using the generated URL.

14. The system of claim 11, further comprising:
determining that a data size for the URL exceeds a maximum data size; and
in response to determining that the data size for the URL exceeds the maximum data size, performing at least one of: (a) compressing at least a portion of the identified item; (b) truncating characters of at least a portion of the identified item included in the parameters; or (c) summarizing at least a portion of the identified item using a text summarization technique.

15. The system of claim 11, wherein appending at least one key-value pair the URL comprises concatenating portions of content of the identified item to the URL based on priority values of each portion of content until a maximum data size for the URL is reached.

16. The system of claim 15, wherein generating the resource view data comprises condensing the portions of the content of the identified item based on the priority value of each portion of content.

17. The system of claim 11, further comprising:
identifying an opt-out control of the resource, the opt-out control specifying at least one portion of the structured resource at which content should not be sent to the server; and
determining to not include content located at the at least one portion of the structured resource in the parameters based on the identified opt-out control.

18. The system of claim 11, wherein identifying content located in at least one particular portion of the structured resource comprises at least one of: (i) evaluating a model of the structured resource to identify one or more particular markup tags included in the structured resource, or (ii) evaluating a computer programming language environment of the structured resource to identify one or more particular functions and executing the identified one or more particular functions.

19. The system of claim 18, wherein identifying content located in identified structural areas of the structured resource comprises identifying content located between a corresponding pair of the particular markup tags.

20. A computer storage medium encoded with a computer program, the program comprising instructions that when executed by data processing apparatus cause the data processing apparatus to perform operations comprising:
generating a data collection tag that includes instructions that, upon execution of the instructions, cause an application browser executing at a client device to perform operations comprising:
identifying, by the client device and within a document object model of a structured resource provided by a publisher, an item presented by the structured resource while the structured resource is presented by the application browser at the client device;
generating, by the client device, resource view data that includes parameters identifying the client device and the item identified in the document object model while the structured resource was presented at the client device;

appending, by the client device and to a uniform resource locator (URL) of a remote server, at least one key-value pair specifying the item that was identified in the document object model while the structured resource is presented by the application browser at the client device; and sending, by the client device and over a network, the key-value pair to the remote server using the URL;

receiving, from the publisher, a request for the data collection tag; and providing the data collection tag to the publisher in response to the request.

\* \* \* \* \*